United States Patent
Shokrollahi et al.

(10) Patent No.: US 8,768,996 B2
(45) Date of Patent: Jul. 1, 2014

(54) METHOD FOR GENERATING A CHALLENGE-RESPONSE PAIR IN AN ELECTRIC MACHINE, AND ELECTRIC MACHINE

(75) Inventors: Jamshid Shokrollahi, Karlsruhe (DE); Simon Kramer, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 524 days.

(21) Appl. No.: 13/193,276

(22) Filed: Jul. 28, 2011

(65) Prior Publication Data

US 2012/0030270 A1 Feb. 2, 2012

(30) Foreign Application Priority Data

Jul. 30, 2010 (DE) .................. 10 2010 038 703

(51) Int. Cl.
*G06G 7/32* (2006.01)
(52) U.S. Cl.
USPC ........................................... 708/802
(58) Field of Classification Search
CPC ............. G06G 7/36; G06G 7/22; G06G 7/55; G06G 7/14; G06G 7/20
USPC ........................................... 708/802
See application file for complete search history.

(56) References Cited

U.S. PATENT DOCUMENTS

| 3,209,341 | A  | * | 9/1965 | Lide | 340/870.32 |
| 6,366,078 | B1 | * | 4/2002 | Irle et al. | 324/207.17 |
| 7,681,103 | B2 |   | 3/2010 | Devadas et al. | |
| 8,228,013 | B2 | * | 7/2012 | Liu et al. | 318/400.33 |
| 2009/0083833 | A1 |   | 3/2009 | Ziola et al. | |
| 2009/0132624 | A1 |   | 5/2009 | Haselsteiner et al. | |
| 2009/0237014 | A1 | * | 9/2009 | Yamada | 318/400.02 |

OTHER PUBLICATIONS

Yevgeniy Dodis, Jonathan Katz, and Leonid Reyzin, "Robust fuzzy extractors and authenticated key agreement from close secrets," Advances in Cryptology, Crypto 2006, vol. 4117 of Lecture Notes in Computer Science, pp. 232-250, Springer Verlag, 2006.

\* cited by examiner

*Primary Examiner* — Tan V. Mai
(74) *Attorney, Agent, or Firm* — Kenyon & Kenyon LLP

(57) ABSTRACT

A method is described for generating a challenge-response pair in an electric machine as the basis for an authentication. The electric machine has at least one stator and at least one rotor. A voltage signal or current signal which causes induction between the rotor and the stator is generated as the challenge, and a variable which is a function of the caused induction is determined as the response.

12 Claims, 4 Drawing Sheets

METHOD FOR GENERATING A CHALLENGE-RESPONSE PAIR IN AN ELECTRIC MACHINE, AND ELECTRIC MACHINE

RELATED APPLICATION INFORMATION

The present application claims priority to and the benefit of German patent application no. 10 2010 038 703.7, which was filed in Germany on Jul. 30, 2010, the disclosure of which is incorporated herein by reference.

FIELD OF THE INVENTION

The present invention relates to a method for generating a challenge-response pair in an electric machine, and to an electric machine.

BACKGROUND INFORMATION

To protect against duplicated or counterfeited technical units, secure authentication of a unit as an original product may be requested by the customer, for example. A relatively new method which may be used for secure authentications is based on the use of so-called physical unclonable functions (PUFs).

United States Published Patent Application No. 2009/0083833 discusses how PUFs, including an additional PUF module for authentication, may be implemented in a variety of electronic devices such as FPGAs, RFIDs, and ASICs. U.S. Pat. No. 7,681,103 discusses reliable generation of a device-specific value, using PUFs.

SUMMARY OF THE INVENTION

The exemplary embodiments and/or exemplary methods of the present invention according to the description herein allows particularly simple and cost-effective authentication of an electric machine, or of a device of which the electric machine is a component, or of a device which is connected to an electric machine, on the basis of induction in the electric machine. Compared to other authentication methods, expensive additional hardware components, in particular an additional PUF module, may be dispensed with. For some of the proposed embodiments of the present invention, necessary additional components are inexpensive and are easily integratable into existing systems. Ways of circumventing the method, for example by intercepting signals or connecting hardware in between, are complicated and expensive, and the manipulations are often easily detectable.

Further advantages and improvements result from the features of the further descriptions herein.

The method may be implemented in a particularly simple and cost-effective manner when a variable which is a function of a voltage in the rotor or stator of the electric machine is determined as the response. For this purpose, in one embodiment, for example, a voltage may be tapped between two points of a rotor coil or of a stator coil via two contacts for these points, and further processed. Because use may be made of additional information, which makes the method more robust, it is particularly advantageous to include not only a voltage value, the voltage amplitude, for example, but also the variation over time of the voltage. This advantageous embodiment may be implemented as hardware with the aid of an additional measuring unit, for example, which measures and further processes the voltage (amplitude and optionally the variation over time).

The challenge signal may be generated by a specialized signal transmitter which is present in the electric machine. This signal transmitter may be cost-effectively implemented and optimized to the method.

In one advantageous embodiment, the position of the rotor for carrying out the method is determined by a position sensor, for example. In this way the conditions for generating the challenge-response pair are optimally defined, and an influence by the instantaneous rotor position on the result is minimized. In one particularly reliable embodiment, the generation of the challenge and the determination of the response are triggered by signals of the position sensor that the rotor is in a certain position. In addition or as an alternative to a position sensor, this triggering may be carried out manually, for example to save on costs of an extra sensor to be optionally provided for this purpose. To this end, for example, two points on the rotor and the stator may be provided with marks. An operator is then able to position the marks (points) next to one another, and thus provide a defined rotor position and trigger the measuring method.

A determination of the response for an authentication may advantageously be used by verifying a response signed beforehand with the aid of a secret key, using the specified response and a public key. A method which may be easily used and therefore cost-effectively implemented is thus provided, with the aid of which a device, or a vehicle having an electric machine, or an electric machine may be authenticated (by a customer, for example), by providing a public key and supplying a response, signed with the aid of a secret key, with/in the electric machine or with/in the device or vehicle.

In another advantageous embodiment, a secret key is generated with the aid of the challenge-response pair (for this purpose, the entire challenge-response pair or only the response may be used), and the secret key is used to verify an authentication message. Thus, for example, a secure communication path may be established between the electric machine and a connected device with comparatively little complexity.

DETAILED DESCRIPTION

Developers and manufacturers of high-quality products must often deal with the problem of product piracy. Although large sums are frequently invested in research and development of such products, they may be illegally copied relatively easily. The problem is not limited just to the manufacturers of the products; due to the greatly reduced quality standards which usually occur, the purchaser of the product may be affected as well. The ability to reliably authenticate products is therefore desirable for manufacturers and customers alike.

The following discussion describes how a challenge-response pair which may be used for authenticating the electric machine or devices connected to the electric machine may be generated in an electric machine. Use is thus made of an induction effect within the electric machine as the basis of a physical unclonable function (PUF). In the present context, electric motors and generators in particular are also included under the term "electric machine." The exemplary embodiments and/or exemplary methods of the present invention are described in part with reference to electric motors, but in principle is also suitable for other, in particular rotating, electric machines.

To protect against duplicated or counterfeited technical units, secure authentication of a unit as an original product may be requested by the customer, for example. One method which may be used for secure authentications is based on the use of so-called physical unclonable functions (PUFs).

A PUF is a function which is based in the physical structure of a component, the structure having many random parameters which are specified by the particular exact manufacture of the individual component. In the use of PUFs for an authentication, use is made of the fact that by varying, for example, geometric and/or material-specific parameters of a physical system during its manufacture, certain responses to a given physical stimulus, so-called challenge-response pairs (CRP), are characteristic of a certain component of a product line. The stimulus is referred to as the challenge, and the reaction of the PUF is referred to as the response. In order to use PUFs for authentications, cryptographic methods are employed which are discussed in detail in the literature (US 2009/0083833 and U.S. Pat. No. 7,681,103, for example).

The exemplary embodiments and/or exemplary methods of the present invention are based on the fact that a variable which is a function of induction in an electric machine may be regarded as a PUF. The random parameters required for an authentication via PUFs during the manufacture of an electric machine concern, for example, the variation in geometric properties (configuration, size) of the stator and rotor, for example the spatial distribution of coil windings or slight asymmetries in the rotor and stator.

Figure 1:
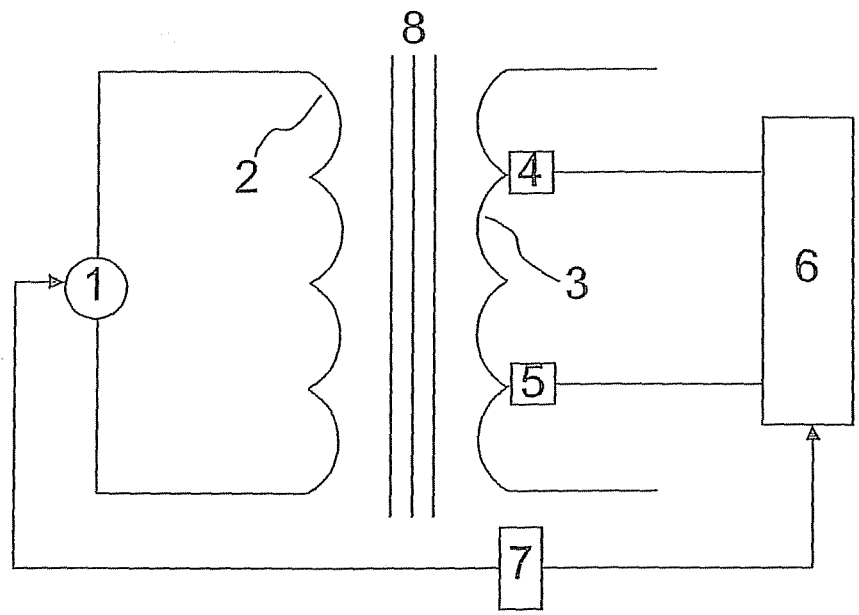
FIG. 1 shows an example of one embodiment of an electric machine having devices for generating or determining a challenge-response pair.

FIG. 1 shows an example of one embodiment for generating a challenge-response pair in an electric machine. In the design shown, a PUF is triggered (challenge) and evaluated (response). For this purpose, in this specific embodiment a coil of the electric machine, in the present case stator coil 2, is connected to a signal source 1. An induction effect is triggered between stator coil 2 and rotor coil 3 with the aid of a fixed voltage signal or current signal from signal source 1 as a challenge. This effect is measured, as shown in FIG. 1, by tapping the voltage between two points 4 and 5 of rotor coil 3. The voltage difference (for example, the amplitude and variation over time) is received by a measuring unit 6 and processed. In this way, measuring unit 6 delivers the response value to the challenge determined by signal transmitter 1. In order for the conditions for this generation of a challenge-response pair to be well-defined, the position of rotor coil 3 (i.e., the position of the rotating rotor) is registered by a position sensor 7, which is able to emit a signal at a specified, predefined rotor position to signal transmitter 1 and to measuring unit 6, and thus to trigger signal generation and measurement. In addition or as an alternative to position sensor 7, such triggering may be carried out manually, for example to save on costs of an extra sensor to be optionally provided for this purpose. To this end, for example, two points on the rotor and the stator may be provided with marks. An operator is then able to position the marks (points) next to one another, and thus provide a defined rotor position and trigger the measuring method. Schematically indicated magnetic field lines are denoted by reference numeral 8 in FIG. 1.

The basic design in FIG. 1 may be varied, for example by reversing the roles of the stator and rotor, or in that the two coils shown are both coils of the rotor, or alternatively, of the stator. It is also conceivable to measure a voltage curve in the coil, which is connected to the signal transmitter.

Points 4 and 5, between which the voltage difference is measured as the basis for the response value, are situated at random (but fixed for this electric machine) locations of a coil. The number of point pairs may be increased to be able to provide a larger number of challenge-response pairs. The response of a certain pair to a given challenge by signal transmitter 1 thus determines a challenge-response pair in each case.

Signal source 1 may be a voltage source which is able to generate, for example, voltage pulses of variable length and fixed amplitude. Triggered by the information of the position sensor (or in the alternative embodiment, by the described manual activation) that the rotor is at the correct position, signal generator 1 generates a signal, for example as a delta voltage peak. The signal may be generated specifically for the generation of the challenge-response pair; the described method may also thus be carried out outside normal operation. Signal source 1 as well as measuring device 6 may be provided extra for the authentication method. Of course, appropriate resources which are present due to other applications may also be used. Position sensor 7 may also possibly be provided extra; if an appropriate sensor system is to be present, it may also be used.

Figure 2:
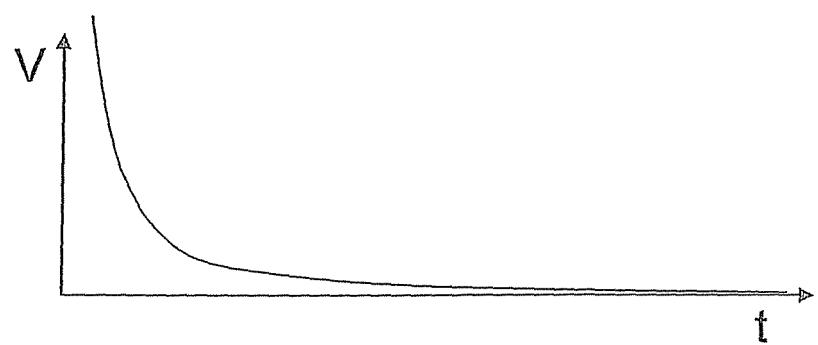
FIG. 2 shows a schematic voltage curve (function curve V(t), voltage V as a function of time t).

FIG. 2 schematically shows a variation over time V(t) of measured voltage difference V between points 4 and 5 in rotor coil 3 after a voltage pulse from signal transmitter 1 in stator coil 2. Reference character V denotes the voltage axis, and reference character t denotes the time axis of the diagram. The amplitude and variation over time of function V(t), which decreases exponentially, for example, are a function of the induction effect between the rotor and the stator (between coils 2 and 3 (including the coil cores) according to FIG. 1) as well as the resistance properties thereof, and function V(t) therefore is once again a function of the previously described manufacturing characteristics (geometry, dimensions, material). As described, these parameters vary among various devices which actually have the same design, so that function V(t) may be used as the basis for an unambiguous identification.

Figure 3:
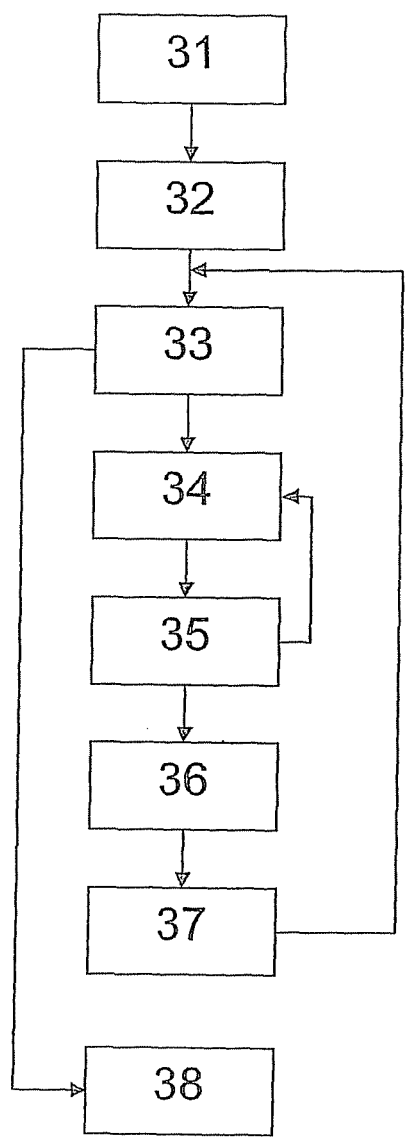
FIG. 3 schematically shows the sequence of a method for determining or processing a voltage curve.

For this purpose, function V(t) from FIG. 2, i.e., the measuring signal which measuring unit 6 in FIG. 1 receives, may be converted into a digital chain. FIG. 3 shows an example of a software flow chart which may be used to measure or map the time-dependent properties of this function. It is a prerequisite that a memory table for N possible entries and a counter are present in the system (i.e., in the electric machine or associated therewith). In addition, threshold values "threshold value (i)" for all possible threshold value counter contents i=0 . . . N are stored.

The time counter is started in step 31. The starting value of i is set to 0 in step 32.

A check is made in step 33 as to whether i is less than N. If this is the case, the method branches to step 34; if this is not the case, the method branches to step 38.

If i is less than N, instantaneous measured value V(t) is read in step 34.

A check is made in step 35 as to whether the value of V(t) is less than the threshold value of instantaneous parameter i. If this is the case, the method branches to step 36. If this is not the case, the method skips to step 34 and from there again to step 35, etc., as long as the condition is met that V(t) is less than threshold value (i), and then branches to step 36.

The value of the time counter is written into the ith position of N positions of the memory in step 36.

Value i is incremented by 1 in step 37. After step 37 the method branches to step 33.

The N time values are concatenated from the memory and are output in step 38.

The measured signal is thus continuously compared to the instantaneous entry (threshold value (i)). If the value is less than the threshold value, the instantaneous time value is stored in a "time" array, and variable "i" is displayed on the next entry in the table containing the threshold values. When all entries have been processed (i=N), the linkage (concatenation) of the entries in the "time" table is output as the character string which characterizes the electric machine, i.e., as the response of the PUF to the challenge.

To reduce adverse noise effects and to increase the security of the method, the response signal may be processed using a "fuzzy extractor." Examples of fuzzy extractors may be found in the following document: Yevgeniy Dodis, Jonathan Katz, and Leonid Reyzin, "Robust fuzzy extractors and authenticated key agreement from close secrets," Advances in Cryptology, CRYPTO 2006, Volume 4117 of Lecture Notes in Computer Science, pages 232-250, Springer Verlag, 2006.

Figure 4:
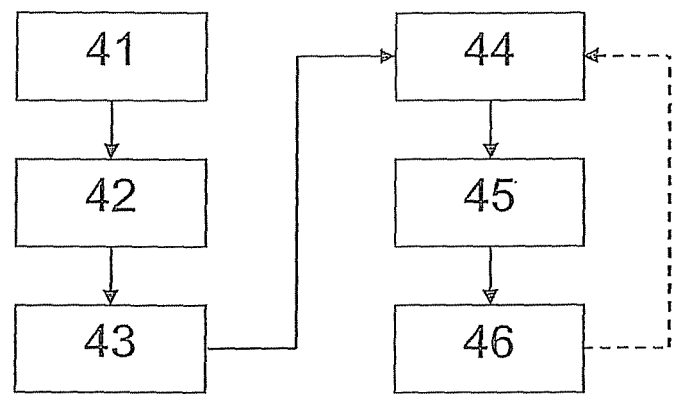
FIG. 4 schematically shows the sequence of a method for authenticating an electric machine.

In one special specific embodiment, the electric machine itself may be authenticated based on the PUF properties of the induction functions of the electric machine. In this exemplary embodiment it is to be verified, for example, whether the electric machine has been manufactured by a certain manufacturer. A corresponding method is schematically shown in FIG. 4.

A physical stimulus (voltage, current), for example as described for FIG. 1, is generated as a challenge in a first step 41.

The response of the PUF, based on the induction effect of the stimulus, is received and processed in step 42, for example as a digital chain as described for FIG. 2. A CRP is thus provided in steps 41 and 42 combined.

The response is signed with the aid of a private (secret) key of the manufacturer in third step 43. This may be carried out internally in the device, if suitable computing resources are present, or also externally. The signature thus obtained may then be provided in or on the electric machine, or in or on the device which contains the electric machine. The signature may, for example, be stored in a special memory or affixed as a barcode to the electric machine or the device. As a specific example, an electric motor could be installed in a power tool, and the signature could be affixed on the outside of the power tool. In another example, an electric motor is installed in a vehicle, and the signature is stored in a memory of the vehicle. In one particular embodiment, before the response is signed it may be modified using a suitable error correction code (ECC).

Steps 41-43 may be carried out in the manufacturing facility for the electric machine or, for example, in an authorized shop by a limited group of authorized persons.

The actual authentication of the electric machine is carried out in steps 44-46, for example by a customer or by the customs office for checking the device or the electric machine for the correct manufacturer identity. For this purpose, the tester applies the challenge, i.e., the physical stimulus, in step 44. This may be carried out, for example, by using an activating element provided for this purpose, or by a signal input providing an appropriate signal for triggering the stimulus or by providing the stimulus directly to the electric machine. In this case, either the correct stimulus signal is automatically triggered, or the value has been retained in step 41, for example by storage in memory or providing the signature.

The challenge from step 44 generates a response in the electric machine which is determined by the tester in step 45. The response is processed as in step 42, for example. With the aid of this response and a public key of the manufacturer of the electric machine, the tester is then able in step 46 to verify the provided (affixed or stored in memory, for example) signature, and thus the origin of the electric machine.

Overall, according to this exemplary embodiment an electric machine may thus be authenticated. This may also be used, for example, for authenticating a vehicle which is at least partially electrically driven, or a power tool. Steps 44-46 may be carried out as often as needed for authentications, as indicated by a dashed-line arrow from step 46 to step 44.

Figure 5:
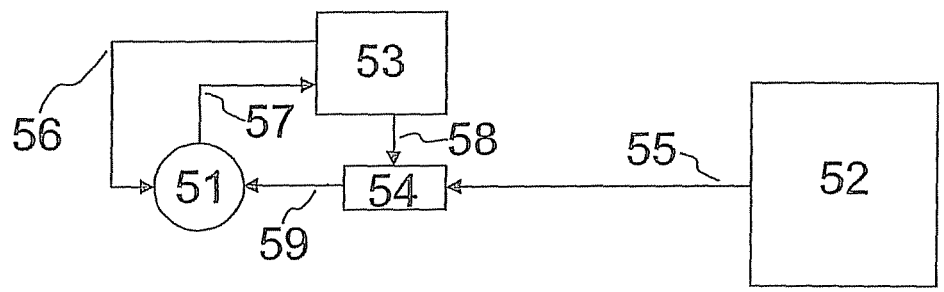
FIG. 5 shows an electric machine having a secure communication path to a connected device.

FIG. 5 shows, with reference to one example of a design, how induction in an electric machine based on physical unclonable functions may be used to establish a secure communication path between an electric machine and a device connected thereto, for example between an electric motor in a vehicle and a connected control unit.

FIG. 5 shows electric machine 51, for example an electric motor in a vehicle, and a device 52, for example a control unit, which is connected to the electric machine.

A fuzzy extractor 53 and a MAC computing and verification unit 54 are associated with the electric machine. Examples of fuzzy extractors are contained in the literature source cited above. These units 53 and 54 may, for example, also be integrated into a circuit, optionally together with other cryptographic functions. Units 53 and 54 may be components of the electric machine, or may be situated externally and associated with the electric machine.

The device 52 is able to send (55) messages to electric machine 51 via a communication link. As described for FIG. 1, means not explicitly shown in FIG. 5 (or schematically added to unit 53) are associated with electric machine 51 via which a challenge-response pair may be determined, based on induction in electric machine 51. For this purpose a challenge is generated (schematically denoted by reference numeral 56 in FIG. 5), thus causing induction. The response of electric machine 51 is schematically denoted by reference numeral 57. On the basis of the challenge-response pair (or on the basis of the response), fuzzy extractor 53 generates a secret key, as described in greater detail for FIG. 6, and sends (58) the secret key to MAC computing and verification unit 54. A message secured using the same secret key in device 52 (supplemental authentication), which has been received (55) by electric machine 51, may thus be checked. The result of the verification results, for example, in processing (59) of the message by the electric machine, or discarding of the message.

When electric machine 51 from FIG. 5 uses the described secure path to communicate with connected device 52, there is a high degree of certainty that the received signals actually originate from the intended device and, for example, have not been manipulated en route.

Figure 6:
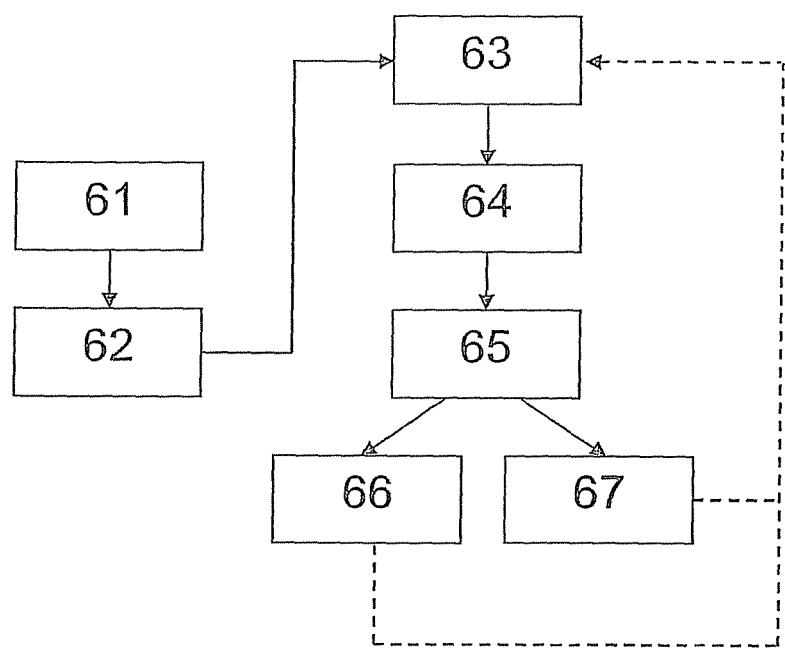
FIG. 6 schematically shows the sequence of a method for establishing a secure communication path between an electric machine and a device connected thereto.

FIG. 6 schematically shows the sequence of a method for establishing a secure communication path between an electric machine and a device connected thereto.

A PUF CRP (challenge-response pair) is determined in step 61, as described for FIG. 1, for example, and a secret key is generated therefrom. The key may be generated internally (for example in the device or the electric machine) or externally. For the example of an electric motor in a vehicle which is connected to a control unit, the key may advantageously be generated by the control unit itself, since control units usually have the standard hardware required for this purpose. The manner in which PUFs may be used to generate cryptographic keys therefrom, for example with the aid of fuzzy extractors, is described, for example, in Yevgeniy Dodis, Jonathan Katz, and Leonid Reyzin, "Robust fuzzy extractors and authenticated key agreement from close secrets," Advances in Cryptology, CRYPTO 2006, Volume 4117 of Lecture Notes in Computer Science, pages 232-250, Springer Verlag, 2006, or in US 2009/0083833 A1.

In step 62 the generated secret key is stored in the device or in a memory associated with the device, which may be in a memory region which is cryptographically protected using specialized hardware, for example, from which it is not possible to easily read the key.

Steps 61 and 62 represent, in a manner of speaking, the initialization of the method, and are carried out in the manufacturing facility, for example. The authentication, i.e., the secure communication between an electric machine and a connected device via a secure communication path, takes place in subsequent steps 63 through 67.

For authenticating the device, the device is able to send a message to the electric machine (step 63), the message being encrypted with the aid of the secret key, or the message may be provided with an identity tag which may be generated only using the secret key. Such an identity tag may be cryptographically implemented using the known methods, for example by using message authentication code (MAC). The identity tag is thus generated by the device which is connected to the electric machine (i.e., the message is encrypted by the device), for which purpose the device has the suitable cryptographic means and hardware resources.

In the exemplary embodiment (where the electric machine is the electric motor in the vehicle, and the device is the control unit), the authentication of the control unit (for example, by sending a message having an identity tag) may be carried out, for example, during start-up or shutdown of the control unit, for example when the engine is started or when the control units and/or engine is/are in overrun mode.

The electric machine then independently generates the provided response in step 64 by applying the challenge signal (as described for FIG. 5) and, similarly to step 61, generates the secret key therefrom, for example with the aid of the fuzzy extractor (see FIG. 5). This secret key is therefore the same as the one stored in step 62.

With the aid of the MAC verification unit, the electric machine checks the correctness of the identity tag (i.e., decrypts the encrypted message) in step 65, and thus checks the identity of the device. Depending on the result of this check, the method branches to step 66 (incorrect identity) or to step 67 (correct identity).

As described, in the event of a failed verification in step 65 the method branches to step 66. Various responses to the failed authentication may be provided in this step. For example, the instruction or the message may be ignored, error messages may be output, the electric machine and/or the device may be deactivated or switched to a "fail-safe mode," or further measures may be taken. In the case of a control unit connected to an electric motor in a vehicle, an electronic immobilizer system, for example, could be activated in the event of the failed authentication. Optionally, the method shown in FIG. 6 may be terminated (for the time being) in step 66, but under the circumstances the method may re-branch to step 63, for example when only one error message is output; i.e., the method is continued with the next message received by the device.

In the event of a correct verification or authentication, the message is accepted and processed in step 67; i.e., the instruction is carried out. Step 67 branches once again to step 63 as soon as the next message is received from the connected device via the secure communication path and is to be verified.

One possible problem with the identification or authentication of (primarily older) electric machines or devices connected thereto, based on PUFs, may be the age-related degradation of parameters which make a critical contribution to the selected PUP. This may be avoided in certain cases by replacing the old response value for defined time periods or for specified events with an instantaneous value, i.e., by updating the CRP.

Thus, for example, based on the exemplary embodiment in FIGS. 5 and 6, the electric machine could generate a new CRP and independently send a secret key generated therefrom to the other device. The secret key is then stored at that location and used for the further method for establishing a secure communication path between the device and the electric machine. For this communication of the secret key, the electric machine and the associated device may optionally still use the old secret key as a safeguard, provided that it is present (stored) in both devices. Such a PUF CRP update may be carried out at regular intervals or after specified periods of time, or also as a function of parameters which indicate aging. The PUF CRP update may be carried out, for example, when the engine or control units is/are in overrun mode in the electrically operated vehicle when the electric machine is an electric motor in a vehicle, and the device connected thereto is an associated control unit.

What is claimed is:

1. A method for generating a challenge-response pair in an electric machine as the basis for an authentication, the electric machine having at least one stator and at least one rotor, the method comprising:
   generating a voltage signal or a current signal which causes induction between the rotor and the stator as the challenge; and
   determining a variable which is a function of the caused induction as the response.

2. The method of claim 1, wherein the response is determined as a function of a voltage between two defined points of a coil of the rotor or of the stator.

3. The method of claim 2, wherein the response is a function of a variation over time and an amplitude of the voltage between the defined points of the coil.

4. The method of claim 1, wherein a position of the rotor is determined.

5. The method of claim 4, wherein the generation of the challenge and the determination of the response are triggered when a defined position of the rotor is detected.

6. The method of claim 5, wherein the defined position of the rotor is detected by a position sensor.

7. The method of claim 1, wherein a response signed beforehand with the aid of a secret key is verified using the specified response and a public key.

8. The method of claim 1, wherein a secret key is generated from the challenge-response pair, and an authentication message is verified with the aid of the secret key.

9. An electric machine, comprising:
   at least one stator;
   at least one rotor;
   a generating arrangement to generate a voltage signal or current signal as the challenge, which causes induction between the rotor and the stator; and a determining arrangement to determine a variable, as a function of the caused induction, as the response.

10. The electric machine of claim 9, further comprising:
a position sensor which is able to determine a position of the rotor.

11. The electric machine of claim 9, further comprising:
a measuring unit for determining a voltage, the measuring unit being connected to at least two points of a coil of the rotor or of the stator.

12. The electric machine of claim 9, further comprising:
a signal unit which is able to generate a defined voltage signal or current signal.

* * * * *